(12) United States Patent
Delago

(10) Patent No.: US 7,891,508 B2
(45) Date of Patent: Feb. 22, 2011

(54) CRANE RADIAL SUPPORT BEARING

(75) Inventor: Pierre C. Delago, Afton, MN (US)

(73) Assignee: Hydralift AmClyde, Inc., St. Paul, MN (US)

( * ) Notice: Subject to any disclaimer, the term of this patent is extended or adjusted under 35 U.S.C. 154(b) by 1288 days.

(21) Appl. No.: 10/786,202

(22) Filed: Feb. 25, 2004

(65) Prior Publication Data
US 2004/0164040 A1 Aug. 26, 2004

Related U.S. Application Data

(60) Provisional application No. 60/450,081, filed on Feb. 25, 2003.

(51) Int. Cl.
B66C 23/84 (2006.01)
(52) U.S. Cl. .................................................... 212/253
(58) Field of Classification Search ................. 212/253, 212/232, 239
See application file for complete search history.

(56) References Cited

U.S. PATENT DOCUMENTS

| 13,976 | A | * | 12/1855 | Burnett | 212/225 |
|---|---|---|---|---|---|
| 1,582,274 | A | * | 4/1926 | Kaltenbach | 212/247 |
| 2,069,471 | A | * | 2/1937 | Baker | 74/424.9 |
| 2,414,573 | A | * | 1/1947 | Wagner et al. | 212/253 |
| 2,512,477 | A | * | 6/1950 | Bowes | 414/142.7 |
| 2,966,752 | A | * | 1/1961 | Wampach | 37/395 |
| 3,292,981 | A | * | 12/1966 | Zaugg | 384/527 |
| 3,651,951 | A | * | 3/1972 | Murakami | 212/224 |
| 3,967,867 | A | | 7/1976 | Richardson | 308/207 R |
| 3,977,531 | A | | 8/1976 | Brewer | 212/59 R |
| 4,061,230 | A | | 12/1977 | Goss et al. | 212/70 |
| 4,184,600 | A | | 1/1980 | Goss et al. | 212/70 |
| 4,216,870 | A | | 8/1980 | Bonneson et al. | 212/223 |

(Continued)

FOREIGN PATENT DOCUMENTS

DE 12 00 216 9/1965

(Continued)

Primary Examiner—Thomas J Brahan
(74) Attorney, Agent, or Firm—Dorsey & Whitney LLP; Stuart R. Hemphill, Esq.

(57) ABSTRACT

The present invention, in one embodiment, is a system for receiving and delivering into a base the radial loads imposed on a crane where the crane has a center post operably connected to the base with a generally cylindrical outer bearing surface and the crane rotates in at least a partial circle around the axis of the center post. The system comprises three or more radial load rollers arranged in a linked sequence in an arc at the outer bearing surface of the center post. Each radial load roller includes an axle and an axis of rotation that is generally parallel to the axis of the center post. The system also comprises a means for anchoring a first radial load roller at one end of the arc and anchoring a second radial load roller at the other end of the arc. The system also comprises links connecting each roller between the first and the second radial rollers to its adjacent rollers to form a flexible chain of said rollers. Finally, the system comprises a means for tensioning the linked radial load rollers to draw each radial load roller into rolling contact with the outer bearing surface and to equalize substantially the radial forces exerted by the radial rollers on the outer bearing surface.

14 Claims, 9 Drawing Sheets

U.S. PATENT DOCUMENTS

| | | | | |
|---|---|---|---|---|
| 4,223,961 | A | | 9/1980 | Martinez .................... 308/174 |
| 4,271,578 | A | | 6/1981 | Robinson et al. ........... 29/426.3 |
| 4,271,970 | A | | 6/1981 | Miller et al. ................ 212/146 |
| 4,354,606 | A | | 10/1982 | Morrow et al. .............. 212/175 |
| 4,395,160 | A | * | 7/1983 | deJong .................... 405/224.4 |
| 4,446,977 | A | * | 5/1984 | McClain .................... 212/247 |
| 4,513,869 | A | | 4/1985 | Goudy ....................... 212/175 |
| 4,524,875 | A | | 6/1985 | Jamieson ................... 212/239 |
| 4,648,729 | A | | 3/1987 | Jones ........................ 384/615 |
| 4,652,177 | A | | 3/1987 | Gunther, Jr. et al. ........ 405/196 |
| 4,688,688 | A | | 8/1987 | Volakakis et al. ........... 212/253 |
| 4,723,852 | A | * | 2/1988 | Ehret ........................ 384/593 |
| 4,787,524 | A | | 11/1988 | Cobb, III et al. ............ 212/150 |
| 5,028,194 | A | | 7/1991 | Robinson ................. 414/139.6 |
| 5,048,642 | A | | 9/1991 | Lloyd ........................ 187/1 R |
| 5,309,816 | A | | 5/1994 | Weyer ........................... 92/32 |
| 5,310,067 | A | | 5/1994 | Morrow ..................... 212/253 |
| 5,328,040 | A | | 7/1994 | Morrow ..................... 212/253 |
| 5,487,478 | A | | 1/1996 | Morrow ..................... 212/253 |
| 5,762,017 | A | | 6/1998 | Groves ....................... 114/230 |
| 5,803,613 | A | | 9/1998 | Riedel et al. ................ 384/276 |
| 5,901,864 | A | | 5/1999 | Morrow ..................... 212/179 |
| 5,971,619 | A | | 10/1999 | Bourgeois-Jacquet ....... 384/448 |
| 6,367,390 | B1 | | 4/2002 | Okubo et al. ............ 105/163.1 |
| 6,422,408 | B1 | | 7/2002 | Lissandre et al. ........... 212/270 |
| 6,450,546 | B1 | | 9/2002 | Montgomery et al. ......... 285/95 |
| 6,491,174 | B1 | | 12/2002 | Day ........................... 212/179 |
| 6,502,524 | B1 | | 1/2003 | Hooper .................. 114/230.12 |
| 6,530,691 | B2 | | 3/2003 | Laenge ....................... 384/259 |
| 6,557,713 | B1 | | 5/2003 | Laenge ....................... 212/253 |
| 6,592,297 | B2 | | 7/2003 | Frijns et al. ................. 405/170 |
| 2002/0079278 | A1 | | 6/2002 | Sanders et al. .............. 212/307 |
| 2002/0166698 | A1 | | 11/2002 | Beato ............................. 175/7 |
| 2003/0070600 | A1 | | 4/2003 | Hooper .................. 114/230.12 |

FOREIGN PATENT DOCUMENTS

| | | |
|---|---|---|
| FR | 769 741 | 8/1934 |
| SU | 1337-338 A | 10/1985 |

* cited by examiner

CRANE RADIAL SUPPORT BEARING

CROSS-REFERENCE TO RELATED APPLICATION(S)

This application claims priority from U.S. Provisional Patent Application No. 60/450,081, filed on Feb. 25, 2003, which is hereby incorporated by reference in its entirety.

BACKGROUND OF THE INVENTION

The present invention relates to an apparatus and methods for resisting thrust loads on a crane. More specifically, the present invention relates to a bearing system for resisting radial (i.e., horizontal) thrust loads from a boom on a post crane.

Ships and offshore platforms need cranes to rapidly and safely load and off-load various material and personnel. Affixable, pedestal-type cranes with a center post have been very popular in marine type applications. On a post crane, the superstructure and boom of the crane rotate on bearings about the axis of the post.

The post serves as the crane's structural base for resisting the thrust loads and overturning moments experienced by the crane. The thrust loads are transferred from the boom to the post via the bearings on which the superstructure rotates about the axis of the post. Specifically, vertical thrust loads are transferred from the boom to the post via a container ring bearing, which comprises a plurality of rollers. Radial (i.e., horizontal) thrust loads are transferred from the boom to the post via the radial bearing ring comprising a plurality of rollers, which rollably engage the outer circumference of the post.

While the post crane has many advantages over other types of cranes in a marine environment, the ability to achieve equal bearing loading about the bearings, especially the radial bearing ring, has been challenging. Failure to achieve equal loading about the bearings can result in uneven bearing roller wear, which can lead to premature repairs and downtime for the crane or even catastrophic failure of the crane.

To achieve equal roller loading about the radial bearing ring, manufacturers have had to rely on precision machining of the bearing ring and its rollers or structures that permit elastic deflections. Both options are less than desirable due to their expense. Also, the commercially available precision bearings with integral rings are limited in size to 6.5 meters in diameter, which in turn limits the load capacity of the crane. There is a need in the art for a more cost effective means of achieving equal roller loading about the radial bearing ring.

BRIEF SUMMARY OF THE INVENTION

The present invention, in one embodiment, is a system for receiving and delivering into a base the radial loads imposed on a crane where the crane has a center post operably connected to the base with a generally cylindrical outer bearing surface and the crane rotates in at least a partial circle around the axis of the center post. The system comprises three or more radial load rollers arranged in a linked sequence in an arc at the outer bearing surface of the center post. Each radial load roller includes an axle and an axis of rotation that is generally parallel to the axis of the center post. The system also comprises a means for anchoring a first radial load roller at one end of the arc and anchoring a second radial load roller at the other end of the arc. The system also comprises links connecting each roller between the first and the second radial rollers to its adjacent rollers to form a flexible chain of said rollers. Finally, the system comprises a means for tensioning the linked radial load rollers to draw each radial load roller into rolling contact with the outer bearing surface and to equalize substantially the radial forces exerted by the radial load rollers on the outer bearing surface.

In another embodiment of the aforementioned system, the links connecting each roller between the first and second rollers comprise pivoting links and fixed links. Each roller between the first and second rollers is connected by pivoting links to one of its adjacent rollers and by fixed links to the other of its adjacent rollers.

The present invention, in another embodiment, is a method for receiving and delivering into a base the radial loads imposed on a crane where the crane has a center post connectable to a base with a generally cylindrical outer bearing surface and the crane rotates in at least a partial circle around the axis of the center post. The method comprises providing a linked sequence of three or more radial load rollers arranged in an arc at the outer bearing surface of the center post. Each radial roller has an axle and an axis of rotation that is generally parallel to the axis of the center post. The method also comprises providing a means for anchoring a first radial load roller at one end of the arc and anchoring a second radial load roller at the other end of the arc. The method also comprises connecting each roller between the first and the second radial rollers with links to its adjacent rollers to form a flexible chain of said rollers. Finally, the method comprises providing a means for tensioning the sequence of radial load rollers to draw each radial load roller into rolling contact with the outer bearing surface and causing the pivoting and fixed links to equalize substantially the radial forces exerted by the radial rollers on the outer bearing surface.

In another embodiment of the aforementioned method, the links used to connect each roller between the first and second rollers to its adjacent rollers are pivoting links and fixed links. Each roller between the first and second rollers is connected by pivoting links to one of its adjacent rollers and by fixed links to the other of its adjacent rollers.

The present invention, in another embodiment, is a bearing system including a bearing surface forming a circumference about a first axis, and a roller chain encompassing at least a segment of the bearing surface. The roller chain includes a first roller, a second roller, a third roller, a first member, and a second member. Each roller includes a rotational axis and a roller surface. The rotational axis for each roller is generally parallel to the first axis, and each roller surface is in rollable contact with the bearing surface. The rollers are radially offset from each other along the bearing surface. The first member interlinks the first and second rollers and maintains the offset distance between the first and second rollers. The second member interlinks the second and third rollers and maintains the offset distance between the second and third rollers.

In one embodiment, the first member is non-rotational relative to the rotational axes of the first and second rollers, and the second member is rotational relative to the rotational axes of the second and third rollers. In another embodiment, the first member is rotational relative to the rotational axes of the first and second rollers, and the second member is rotational relative to the rotational axes of the second and third rollers.

The present invention, in another embodiment, is a method of delivering radial loads from a first structure into a bearing surface of a second structure. The bearing surface forms a circumference about a first axis and the first structure is rotationally displaceable about the first axis. The method includes routing a roller chain along at least a circumferential segment of the bearing surface. The roller chain has a first end, a second end, and a plurality of flexibly interlinked rollers between the first and second ends. Each roller includes an axis of rotation that is generally parallel to the first axis. The method further includes operably connecting the first end of the roller chain to a first point on the first structure, operably connecting the second end of the roller chain to a second point on the first structure, and causing each roller to rollably contact the bearing surface.

In one embodiment, during operation, the roller chain radially displaces along the bearing surface as the first structure rotates about the first axis. As the roller chain displaces along the bearing surface, the rollers rollably travel along the bearing surface.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
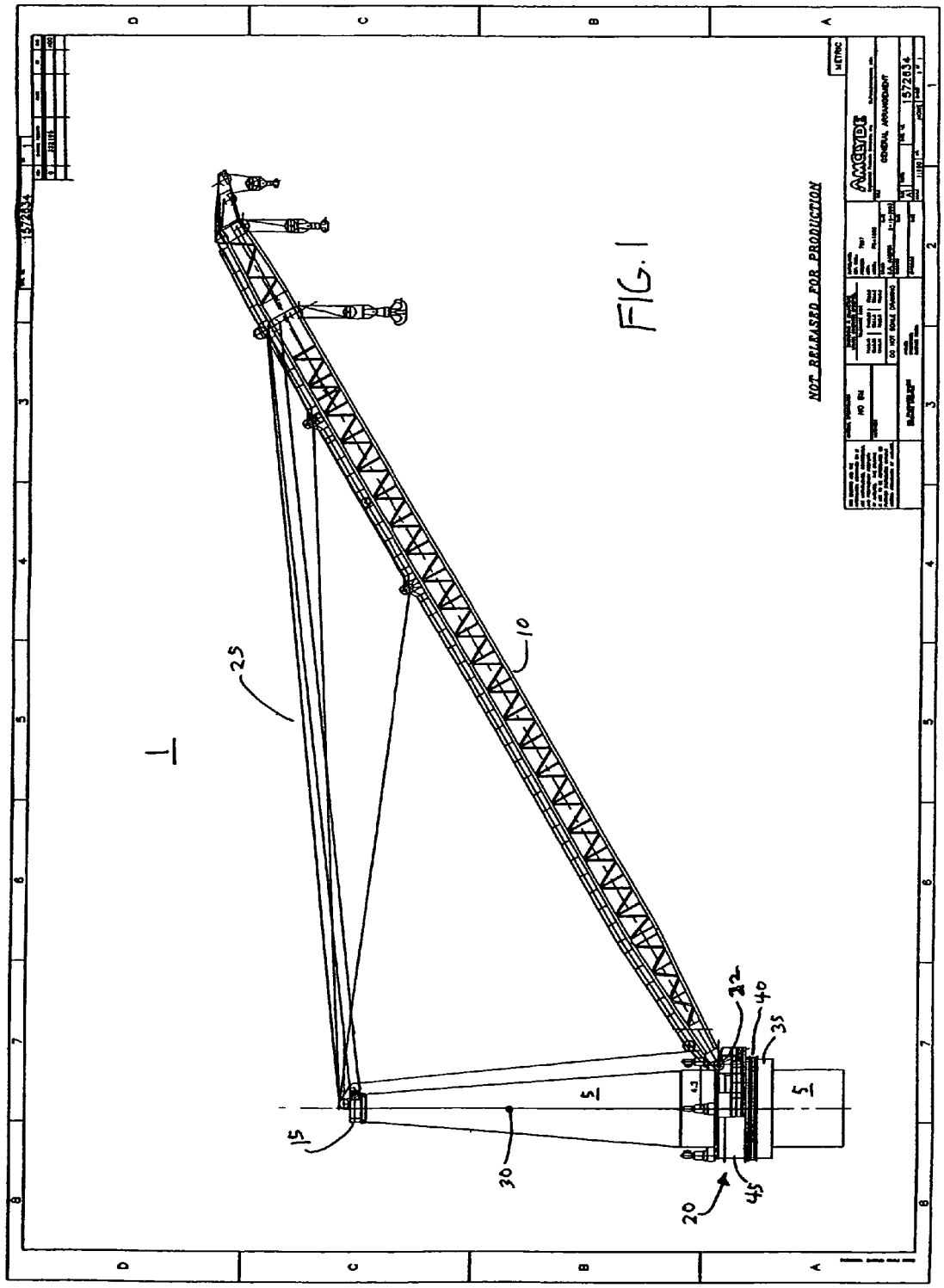
FIG. 1 is a side elevation view of a post crane.

FIG. 1 is a side elevation view of a post crane 1 having a tapered post 5, a boom 10, a swivel post-head 15 swivelly mounted on top of the tapered post 5, and a superstructure 20. The boom 10 is pivotally connected to the superstructure 20 at the boom foot 22 and supported by wire rope 25 running from the swivel post-head 15 to locations on the boom 10. The post 5 may be rigidly mounted to any desired supporting structure or base (not shown) such as a pedestal of an off-shore platform, a ship deck, a moveable vehicular frame, a permanent foundation embedded in the earth, or any other structure. The superstructure 20 and swivel post-head 15 may rotate about the vertical axis 30 of the tapered post 5, thereby allowing the boom 10 to displace radially about the vertical axis 30 of the post 5. The post 5 supports the superstructure 20 and serves as the primary structure for resisting the thrust loads, radial loads, and overturning moments experienced by the crane 1.

Figure 2:
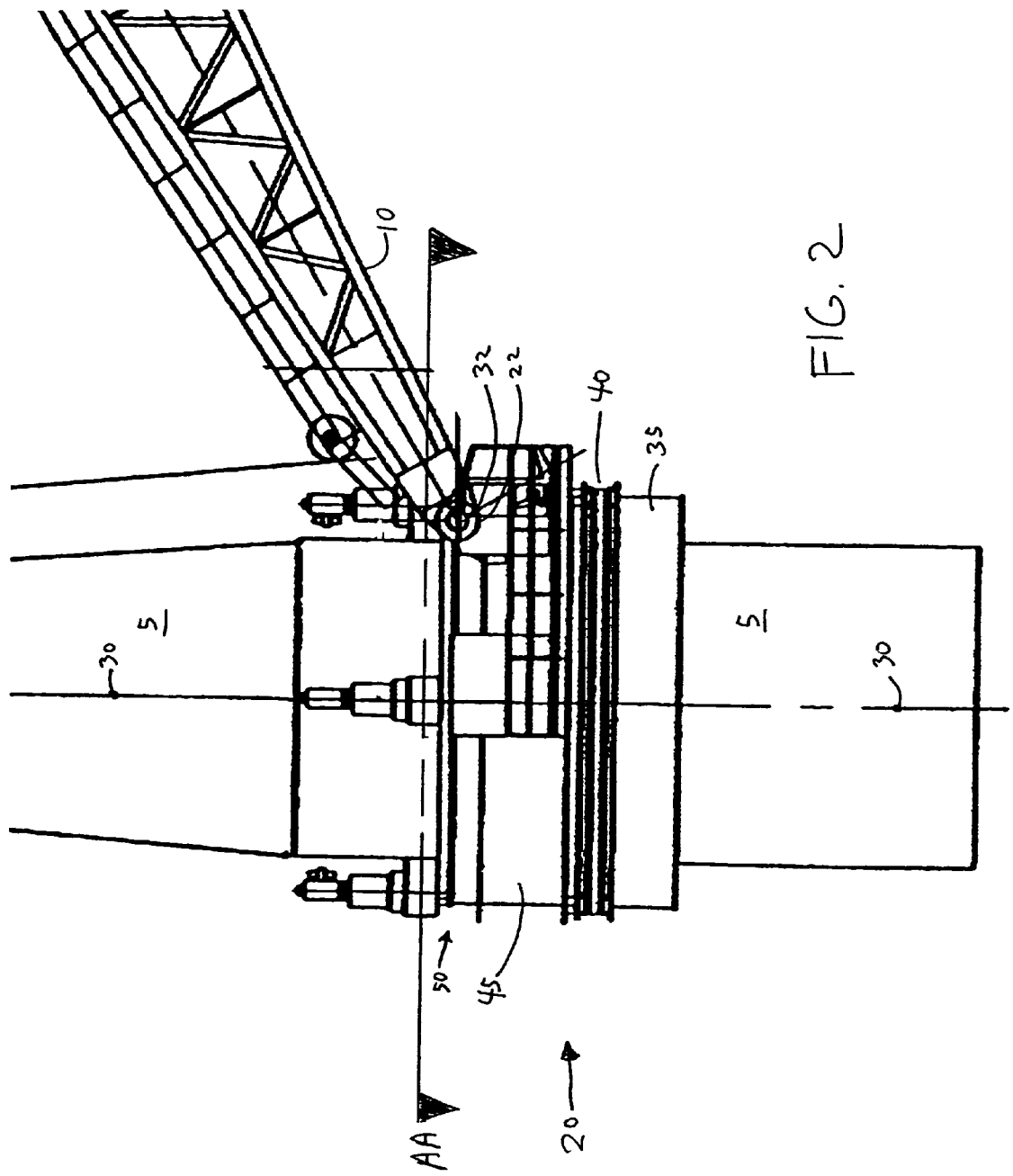
FIG. 2 is a detailed side elevation of the superstructure of the crane shown in FIG. 1.

FIG. 2 is a detailed side elevation of the superstructure 20 and more clearly shows the connection of the boom 10 to a boom pivot point 32 on the boom foot 22. Below the superstructure 20, a support collar 35 is connected to the post 5 and encompasses the outer circumference of the post 5. The support collar 35 supports a container ring 40, which encircles the outer circumference of the post 5. An annular ring 45, which is part of the superstructure 20 and encircles the outer circumference of the post 5, rides on the container ring 40. The annular ring 45 supports a machine deck 50 to which the boom foot 22 is mounted.

Figure 3:
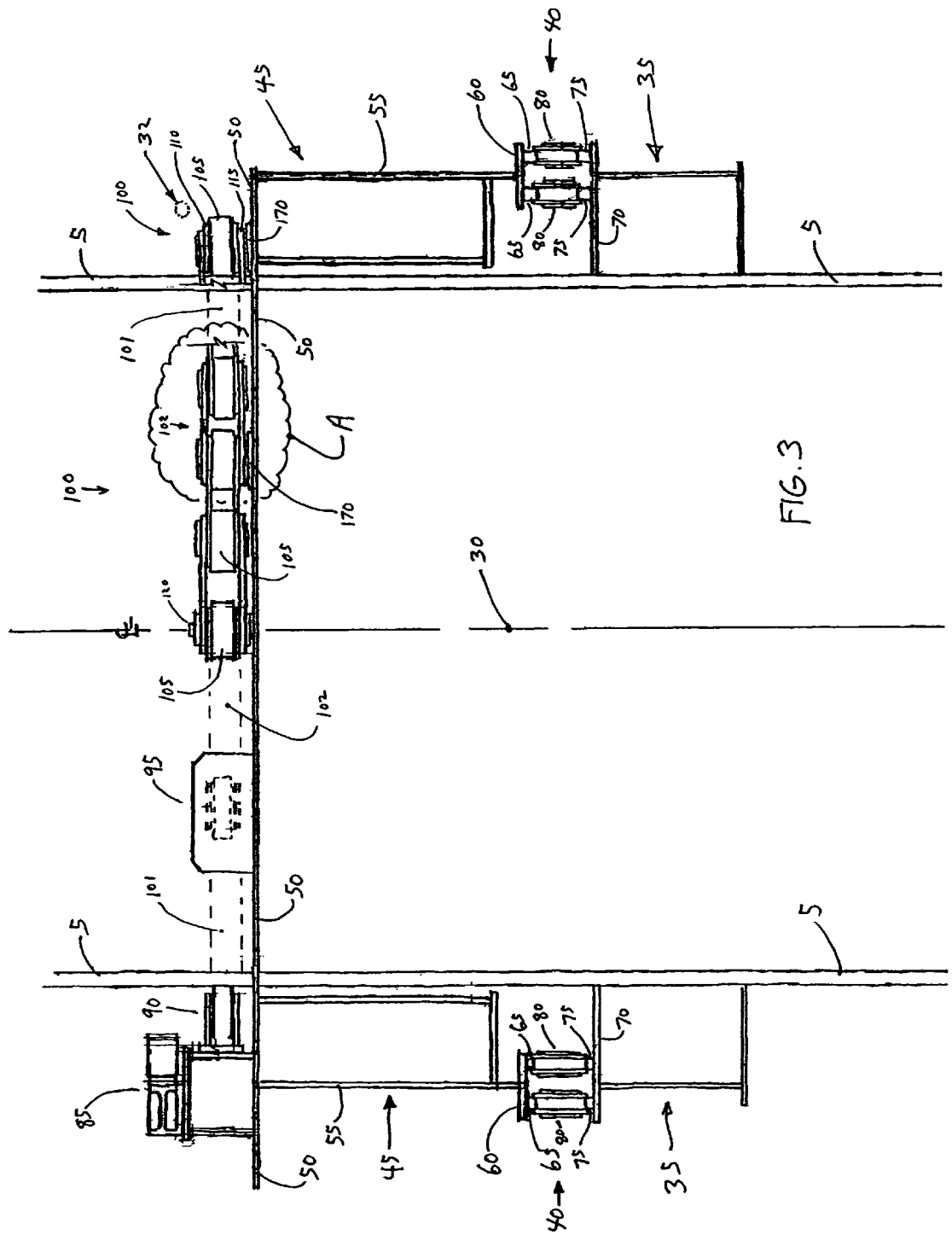
FIG. 3 is a detailed cross-sectional view of FIG. 2.

For a better understanding of the relationship between the support collar 35, the container ring 40, the annular ring 45, and the machine deck 50, reference is now made to FIG. 3, which is a detailed cross-sectional view of FIG. 2. As shown in FIG. 3, the annular ring 45 comprises the machine deck 50, an outer vertical wall 55, a roller plate 60, and a first pair of rails 65. The machine deck 50 encircles the post 5 and forms the top surface of the annular ring 45. The outer vertical wall 55 runs from the machine deck 50 and tees into the roller plate 60. The first pair of rails 65 is connected to the bottom surface of the roller plate 60. The annular ring 45 and machine deck 50 are rotationally displaceable about the outer circumference of the post 5.

As illustrated in FIG. 3, the support collar 35 encompasses, and is connected to, the outer circumference of the post 5. The support collar 35 comprises a flat upper deck 70 and a second pair of rails 75. The second pair of rails 75 is mounted on the top of the upper deck 70.

As indicated in FIG. 3, the container ring 40 comprises pairs of flanged rollers 80 encircling the outer circumference of the post 5. The flanged rollers 80 ride on the second pair of rails 75 and the first set of rails 65 ride on the flanged rollers 80. Thus, the flanged rollers 80 of the container ring 40 support the annular ring 45 above the support collar 35 and allow the annular ring 45 to rotate about the axis 30 of the post 5. The support collar 35 carries substantially all of the vertical (thrust) loads of the crane 1 into the post 5.

In one embodiment of the invention, as shown in FIG. 3, a stewing gear assembly 85, a first back roller 90, a second back roller 95, and a roller chain bearing 100 are located on or above the machine deck 50. In another embodiment of the invention, the first back roller 90 is not present. FIG. 3 shows in phantom the elevation location of the boom pivot point 32 relative to the machine deck 50 and the post 5. The first and second back rollers 90, 95 and the roller chain bearing 100 are used to carry radial (i.e., horizontal) loads, which are induced by the thrust of the boom 10, into the post 5. The roller chain bearing 100 comprises interlinking chain segments 102, which have horizontally oriented rollers 105 connected together by pairs of pivot link plates 110 and fixed link plates 115. As indicated in phantom, the post 5 has structural reinforcement 101 along the interior circumference of the post 5. This structural reinforcement 101 allows the post 5 to withstand the loads exerted on the post 5 by the rollers 105 of the roller chain bearing 100.

Figure 4A:
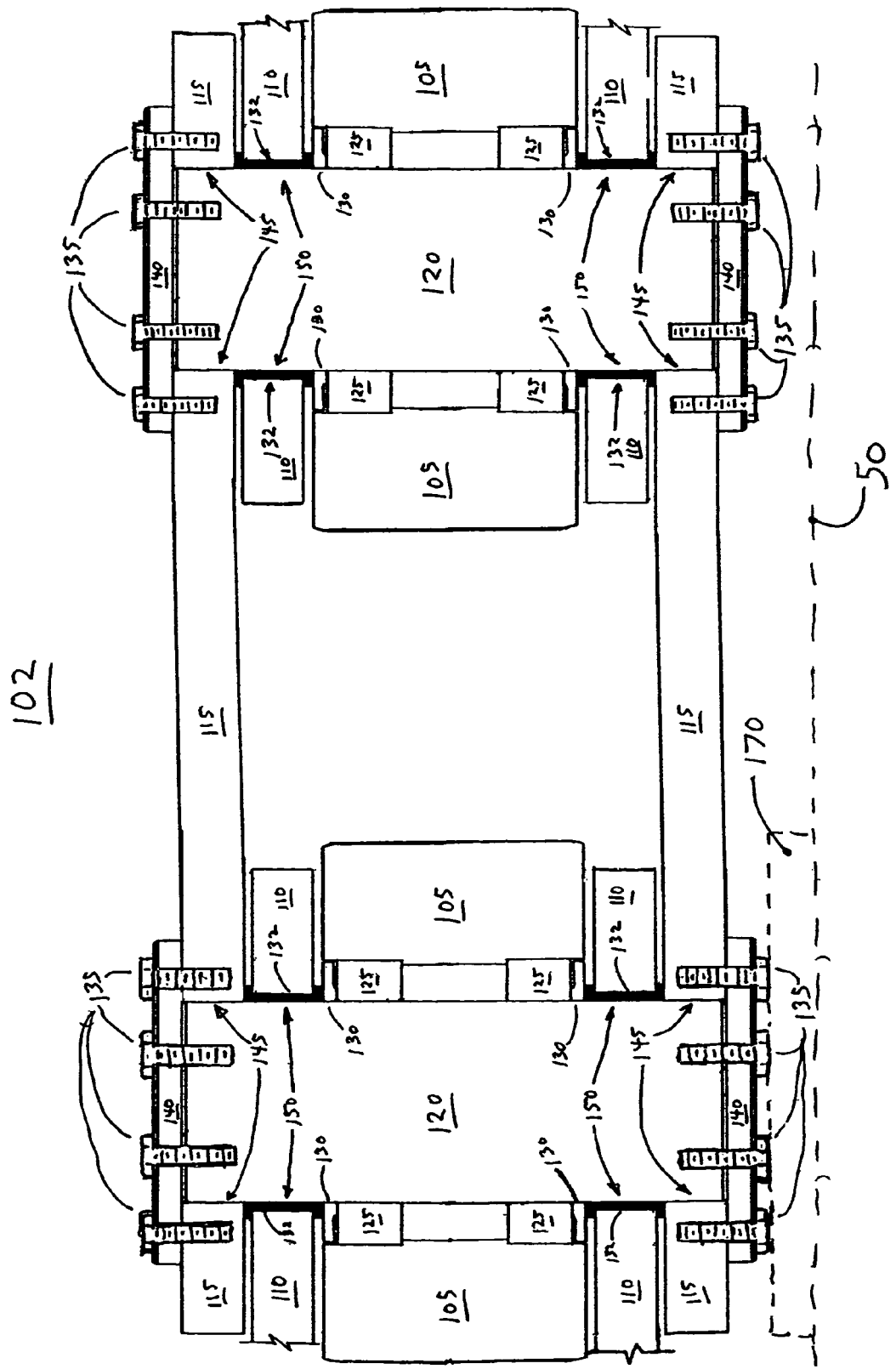
FIG. 4A is a detailed cross-section elevation of the chain segment located within cloud A of FIG. 3.

For a better understanding of the structure of the roller chain bearing 100, reference is now made to FIG. 4A, which is a detailed cross-section elevation of the chain segment 102 located within cloud A of FIG. 3. As shown in FIG. 4A, the chain segment 102 has two horizontally oriented rollers 105, a pair of fixed link plates 115, two vertically oriented roller axles 120, two pairs of annular bearings 125, two pairs of annular bearing covers 130, two pairs of annular bushings 132, four sets of bolts 135, and four axle covers 140. Each chain segment 102 is connected to the pairs of pivot link plates 110 of the adjacent chain segments 102. Thus, the chain segments 102 anchored to the machine deck 50 at each end of the roller chain bearing 100 will have one adjacent chain segment 102 and, as a result, will be connected to only one pair of pivot link plates 110. All other chain segments 102 of the roller chain bearing 100 will have two adjacent chain segments 102 and, as a result, will be connected to two pairs of pivot link plates 110.

As illustrated in FIG. 4A, each roller 105 is rollably supported about a roller axle 120 by a pair of bearings 125. A bearing cover 130 encircles each roller axle 120 and is located adjacent to the outside surface of each bearing 125. The end of each roller axle 120 resides in an opening 145 in a fixed link plate 115 near the end of the fixed link plate 115. The bolts 135 secure a fixed link plate 115 and an axle cover 140 to each end of a roller axle 120. This prevents a roller axle 120 from rotationally displacing within the opening 145 of a fixed link plate 115.

Each roller axle 120 resides within two bushings 132, which are located in openings 150 in the pivot link plates 110 near the ends of the pivot link plates 110. Thus, each pair of pivot link plates 110 may pivot about a roller axle 120 via a pair of bushings 132.

Figure 4B:
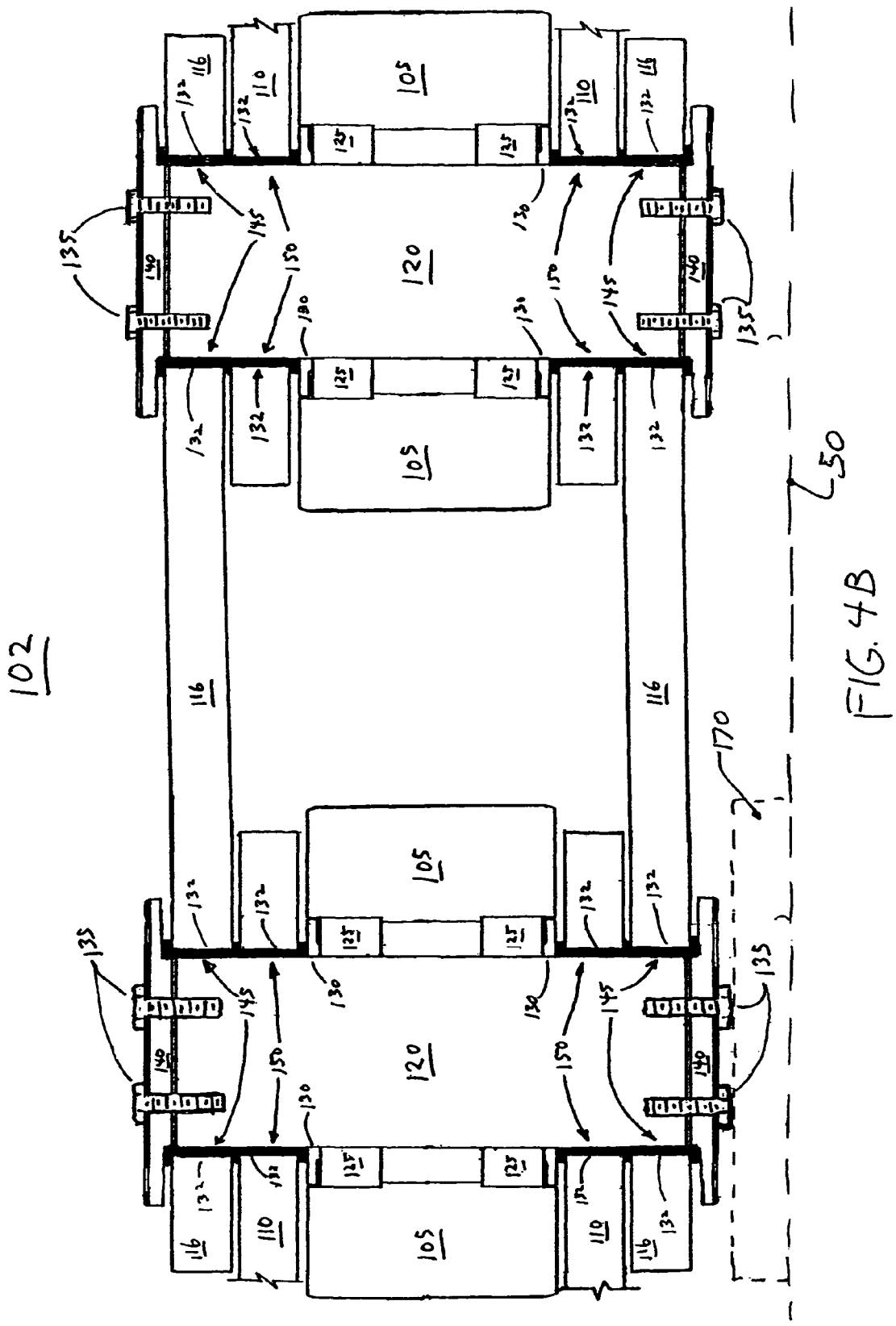
FIG. 4B is a detailed cross-section elevation of an alternate embodiment of the chain segment located within cloud A of FIG. 3.

In another embodiment, as indicated in FIG. 4B, a set of outer pivot link plates 116 (i.e., a second set of pivot link plates) is substituted for the fixed link plates 115. The end of each roller axle 120 resides within a bushing 132, which is located in an opening 145 in the outer pivot link plate 116 near the end of a outer pivot link plate 116. The bolts 135 secure an axle cover 140 to each end of a roller axle 120. Again, each roller axle 120 resides within two bushings 132, which are each located in an opening 150 of the pivot link plate 110 near the end of a pivot link plate 110. Thus, in the embodiment depicted in FIG. 4B, each pair of pivot link plates 110 and outer pivot link plates 116 may pivot about a roller axle 120 via a pair of bushings 132.

Figure 5:
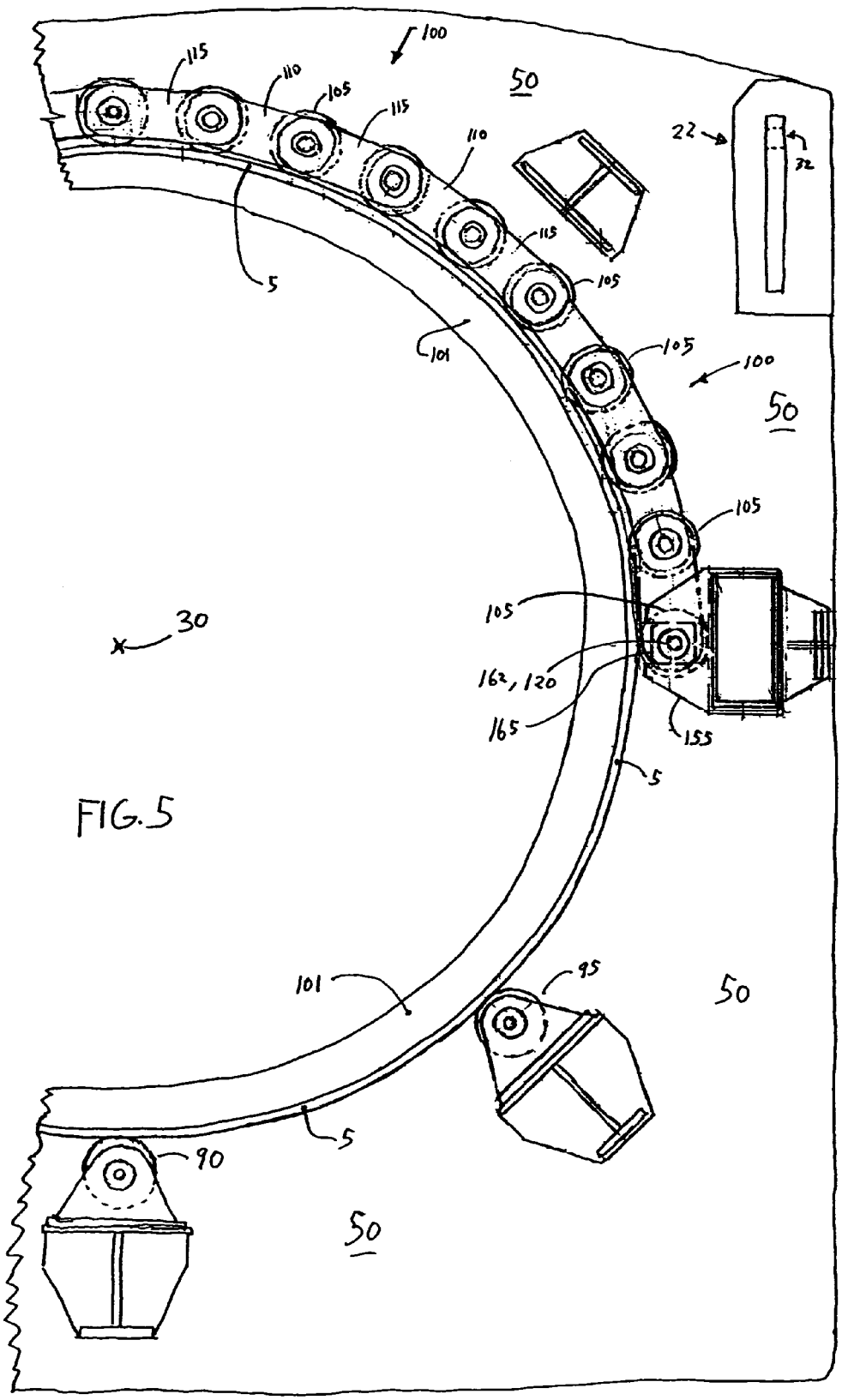
FIG. 5 is a cross-section plan view of half of the post and machine deck taken across section line AA in FIG. 2.

For an understanding of the arrangement of the roller chain bearing 100 and its interaction with the post 5 or, more specifically, the post bearing surface 5, reference is now made to FIG. 5, which is a cross-section plan view of half of the post 5 and machine deck 50 taken across section line AA in FIG. 2. FIG. 5 shows half of a roller chain bearing 100 that, in one embodiment, forms a 180-degree arc about the outer surface of the post 5. FIG. 5 also shows a boom foot 22 located at approximately the two o'clock position. This boom foot 22 is one of the two boom feet 22 mounted on the machine deck 50. FIG. 5 also shows back rollers 90, 95 located at the four-thirty and six o'clock positions and structural reinforcement 101 on the interior circumference of the post 5. The back rollers 90, 95 are two of the three back rollers 90, 95 mounted on the machine deck. In other embodiments of the invention, there may be a greater or lesser number of back rollers 90, 95. For example, in one embodiment, the first back roller 90 (i.e., the back roller at the six o'clock position) is not present. The structural reinforcement 101 allows the post bearing surface 5 to withstand the loads exerted on the post bearing surface 5 by the rollers 105 of the roller chain bearing 100 and the back rollers 90, 95.

It should be noted that the arrangements of the roller chain bearing 100, the back rollers 95, and the boom feet 22 are symmetrical about the axis 30 of the post 5 on a plane that is perpendicular to the axis 30 (i.e., the machine deck 50). Thus, if FIG. 5 were an illustration of the full diameter of the post 5 and the machine deck 50, in one embodiment, a back roller 95 would be visible at the seven-thirty position and another boom foot 22 would be visible at approximately the ten o'clock position. Also, one would see that the roller chain bearing 100 runs continuously from the three o'clock position, past the twelve o'clock position, to the nine o'clock position. In other words, in one embodiment of the invention, as shown in FIG. 5, the roller chain bearing 100 encompasses 180 degrees of the outer surface of the post 5. In other embodiments, the roller chain bearing 100 encompasses greater or lesser extents of the circumference of the outer surface of the post 5. For example, in one embodiment, the roller chain bearing 100 encompasses 120 degrees of the outer surface of the post 5. In another embodiment, the roller chain bearing 100 encompasses 270 degrees of the outer surface of the post 5. In yet another embodiment, the roller chain bearing 100 encompasses the full 360 degrees of the outer surface of the post 5. In other embodiments, the circumference segment of the post 5 encompassed by the roller chain bearing 100 ranges from approximately 30 degrees to approximately 360 degrees.

In one embodiment of the invention, as illustrated in FIG. 5, the last roller axle 120 at the end of the roller chain bearing 100 is anchored in an anchor bracket 155 that is secured to the machine deck 50 and located at the three o'clock position. Again, it should be noted that the arrangement of the roller chain bearing 100 and the back rollers is symmetrical about the axis 30 of the post 5. Thus, if FIG. 5 were an illustration of the full diameter of the post 5 and the machine deck 50, an anchor bracket 155 would be visible at the nine o'clock position. In other embodiments of the invention, the anchor brackets 155 are located at other positions about the outer surface of the post 5. For example, in one embodiment, the anchor brackets 155 anchoring the ends of the roller chain bearing 100 are located at the seven-thirty and four-thirty positions. In other embodiments, the anchor brackets 155 are located at other locations about the circumference of the post 5.

Figure 6:
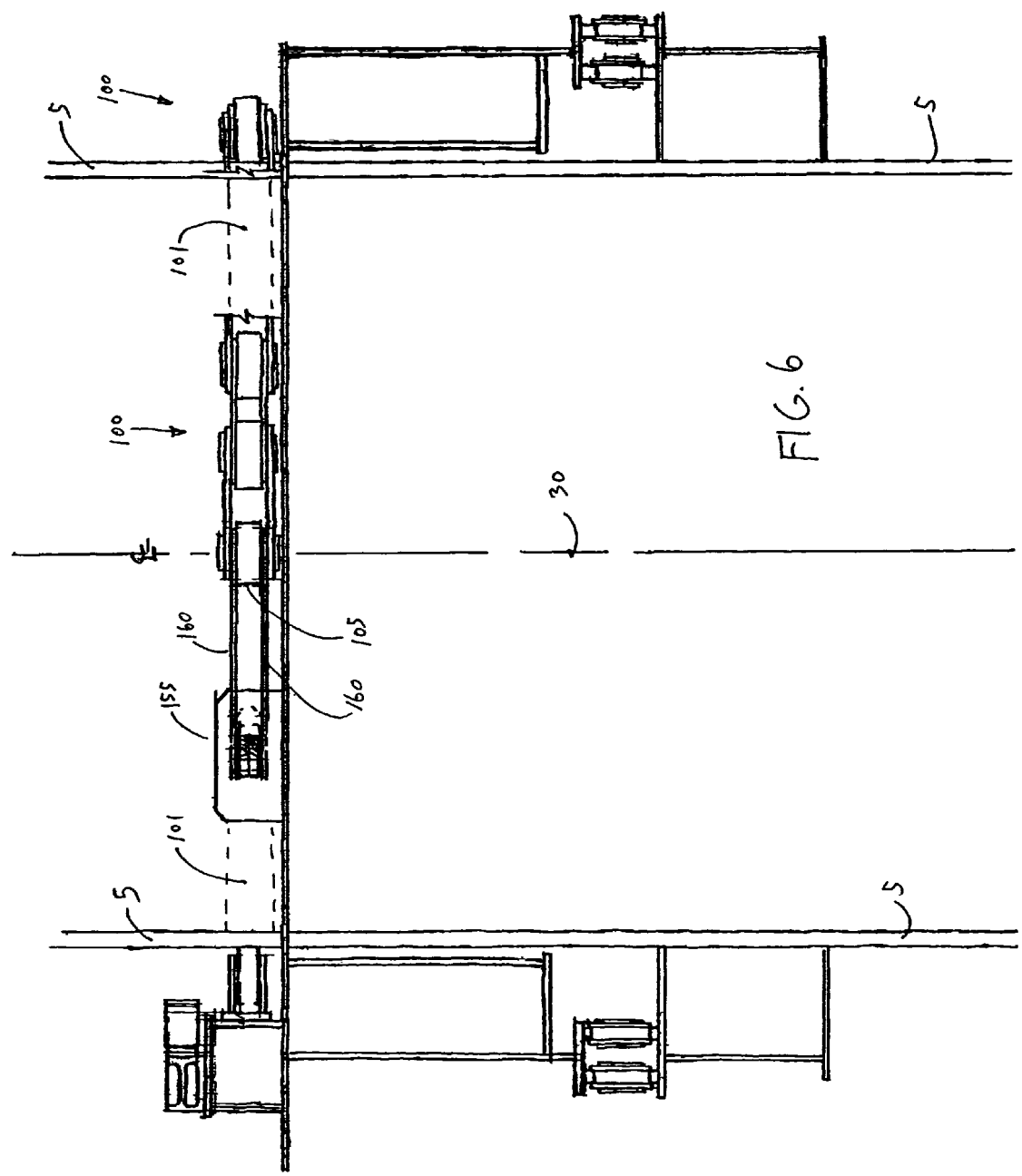
FIG. 6 is a detailed cross-sectional view of FIG. 2 in another embodiment of the invention.
Figure 7:
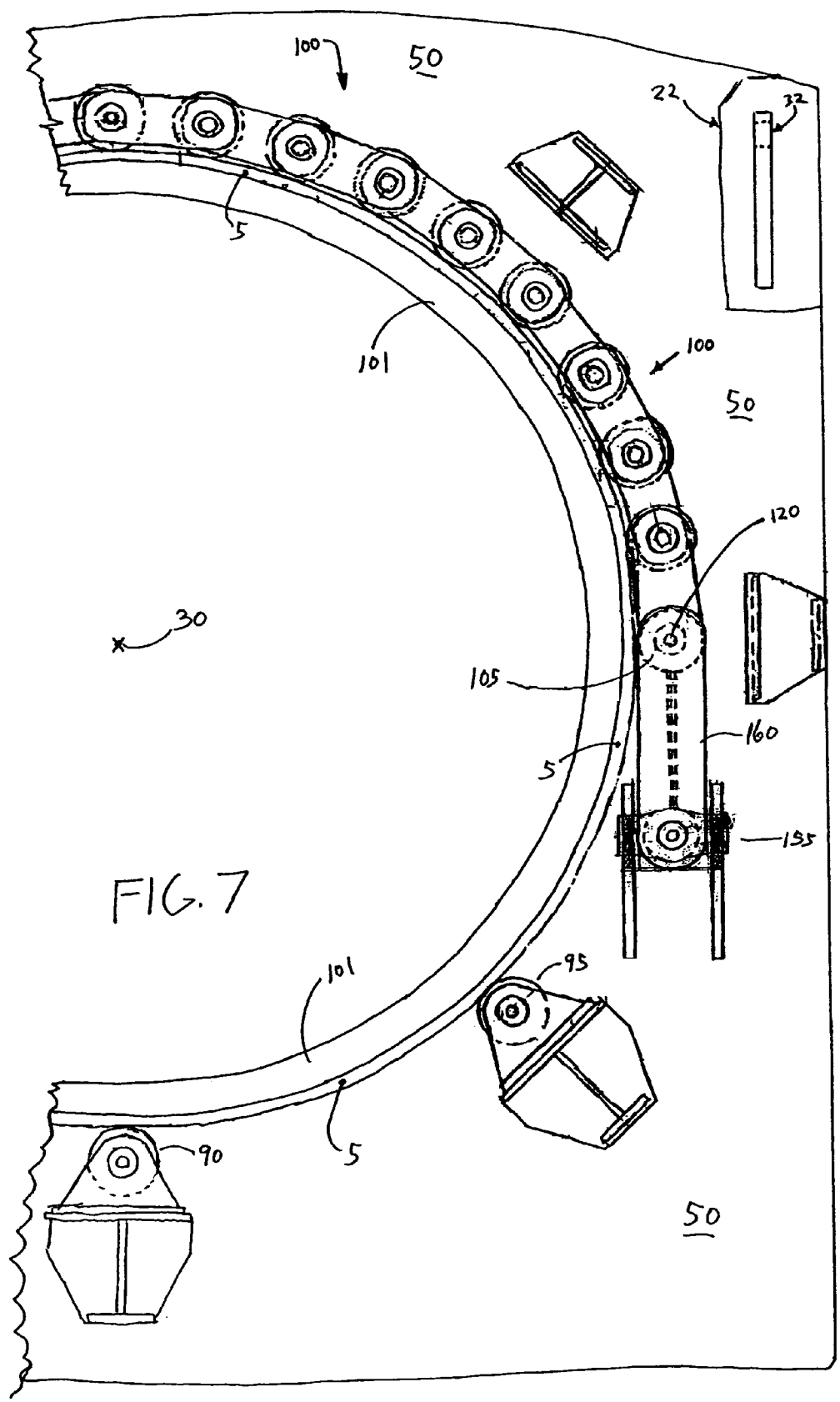
FIG. 7 is a cross-section plan view of half of the post and machine deck taken across section line AA in FIG. 2 in another embodiment of the invention.

In another embodiment, as shown in FIGS. 6 and 7, the anchor bracket 155 is located at approximately the four o'clock position. The anchor bracket 155 has a pair of extended link plates 160 that run between the axle 120 of the last roller 105 of the roller chain bearing 100 at the three o'clock position and the anchor bracket 155. The extended link plates 160 tangentially leave the circumference of the post 5 at the three o'clock position as they run to the anchor bracket 155. Again, because the anchor bracket 155 arrangement is symmetrical about the circumference of the post 5, a pair of extended link plates 160 run between the axle 120 of the last roller 105 of the roller chain bearing 100 at the nine o'clock position to an anchor plate 155 located at approximately the eight o'clock position.

As illustrated in FIGS. 3 and 5, the roller axle 120 located at the anchor bracket 155 is extended and resides in a hole 162 in an anchor block 165. The hole 162 is off-center from the geometrical center point of the anchor block 165. Pivoting the anchor block results in a cam-action that allows the roller chain bearing 100 to be adjusted in length about the outer circumference of the post 5 for typical roller wear.

As shown in FIG. 5, the rollers 105 are evenly distributed along the length of the roller chain bearing 100. For example, in one embodiment, there is a ten-degree spacing between each roller 105 about the axis 30 of the post 5. In another embodiment, there is a five-degree spacing between each roller 105 about the axis 30 of the post 5. In another embodiment, there is a 15-degree spacing between each roller 105 about the axis 30 of the post 5. In other embodiments, the range of possible equal spacings for the rollers 105 about the axis 30 of the post 5 will be from approximately two degrees to approximately 20 degrees.

As illustrated in FIG. 3, in one embodiment of the invention, the roller chain bearing 100 is supported above the machine deck 50 and prevented from displacing vertically along the outer circumference of the post 5 by pads 170 located below some or all of the axles 120 of the roller chain bearing 100. In another embodiment, structural members are secured to the machine deck 50 at various locations adjacent to the outer circumference of the roller chain bearing 100. The structural members have flanges that extend below the top fixed link plate 115, thereby supporting the roller chain bearing 100 above the machine deck 50 and preventing the vertical displacement of the roller chain bearing 100 along the outer circumference of the post 5. In another embodiment, the stiffness and mass of the roller chain bearing 100, along with the thrust loads exerted on the roller chain bearing 100 by the boom 10, combine to prevent the vertical displacement of the roller chain bearing 100 without additional structural support.

Figure 8:
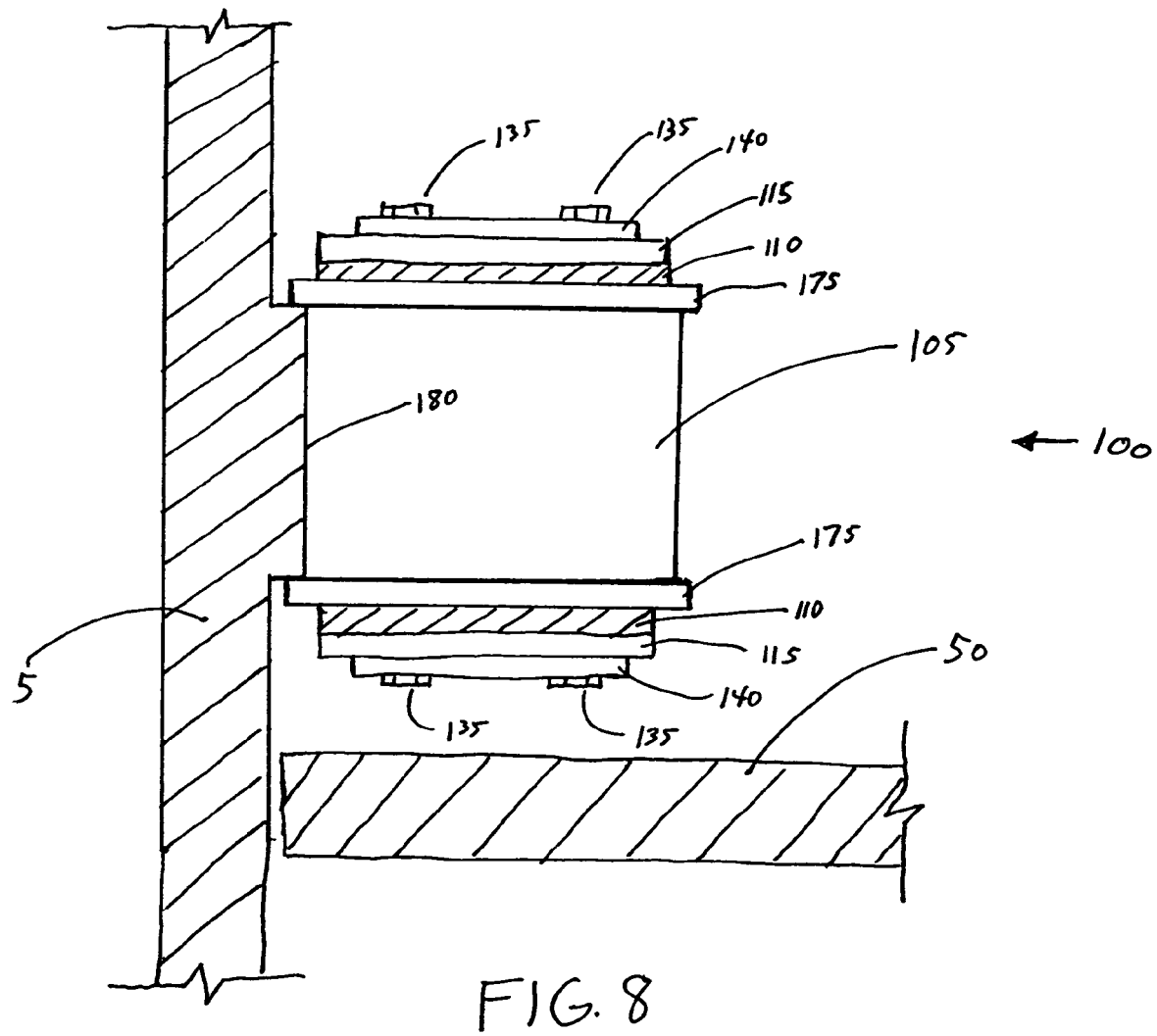
FIG. 8 is a lateral cross-section elevation view of the roller chain bearing, wherein the view cuts across the pivot link plates between two rollers.

Another means of preventing vertical displacement of the roller chain bearing 100 is illustrated in FIG. 8, which is a lateral cross-section elevation view of the roller chain bearing 100, wherein the view cuts across the pivot link plates 110 between two rollers 105. As shown in FIG. 8, the rollers 105 of the roller chain bearing 100 have flanges 175 for mating with a rail 180 encircling the outer circumference of the post 5. The rail 180 serves as a post bearing surface. In another embodiment, the roller 105 has a double inclined face for mating with a rail 180 having a V profile. In other embodiments, the roller 105 and rail 180 will have a circle segment or other cross-sectional profiles that will allow the bearing surface of the roller 105 and rail 180 to mate, align and prevent vertical displacement of the roller chain bearing 100 along the outer circumference of the post 5.

As can be seen from FIG. 5, as the machine deck 50 of the superstructure 20 rotates about the axis 30 of the post 5, the back rollers 90, 95 and the rollers 105 of the roller chain bearing 100 roll along the outer surface of the circumference of the post 5 and transfer any radial (i.e., horizontal) thrust load from the boom 10 to the post 5. The pivot link plates 110 of the roller chain bearing 100 allow the roller chain bearing 100 to flex to conform to the outer circumference of the post 5. In other words, in one embodiment, the roller chain bearing 100 is a series of flexibly linked rollers 105 that form a radial bearing surface that conforms to at least a portion of a radial bearing surface on the outer circumference of the post 5.

The roller chain bearing 100 is advantageous because it provides an effective method of substantially equalizing roller loads without having to rely on precision machining or elastic deflections to equally share roller loads. When a slewing gear assembly 85 that is removable in segments is used, the configuration and location of the roller chain bearing 100 also eases servicing. Specifically, the structure allows the replacement or other servicing of the means of resisting radial (i.e., horizontal) thrust from the boom 10 without having to remove the boom 10, the machine deck 50, or superstructure 20.

Although the present invention has been described with reference to preferred embodiments, persons skilled in the art will recognize that changes may be made in form and detail without departing from the spirit and scope of the invention.

We claim:

1. A crane comprising:
    a vertical post including a post bearing surface forming at least a partial arc about a vertical axis of the vertical post;
    a superstructure pivotal about the vertical post and including a boom foot having a pivot point;
    a boom extending from the boom foot and pivotable in a vertical plane about the pivot point in response to one or more lines extending between the boom and a swivel-post head near a top of the vertical post;
    a single roller chain encompassing at least a segment of the post bearing surface and comprising:
        a plurality of rollers arranged in a pivotally-linked sequence, each roller including a rotational axis generally parallel to the vertical axis of the vertical post and a roller surface in rolling contact with the post bearing surface, wherein the rollers are distributed with equal spacing on an arc along the post bearing surface with at least 180 degrees between a first roller and a last roller;
        a first anchor coupled to the crane superstructure and operably, pivotally-linked to the first roller; and
        a second anchor coupled to the crane superstructure and operably, pivotally-linked to the last roller; and
        the first and second anchors being positioned to make the arc of the roller chain substantially symmetrical with respect to the vertical plane of boom motion and to tension the rollers against the post-bearing surface, whereby the pivoting action of the rollers maintains substantially equal distribution of radial loads from the boom across all rollers in the roller chain.

2. The crane of claim 1, wherein the pivot point is located above the roller chain.

3. The crane of claim 1, further comprising:
    a support collar radially extending from the vertical post;
    an annular ring extending from the superstructure; and
    a container ring including a plurality rollers having rotational axes generally perpendicular to the vertical axis and wherein the rollers rollingly displace between the support collar and the annular ring.

4. The crane of claim 3, wherein the container ring is located below the roller chain.

5. The crane of claim 1, wherein the post bearing surface is the outer surface of the vertical post.

6. The crane of claim 1, wherein the post bearing surface has a rail and at least one roller of the roller chain is flanged to engage the rail.

7. The crane of claim 1, wherein the rollers of the roller chain have a double inclined faces, the post bearing surface has a rail with a V profile, and the double inclined faces of the rollers matingly interface with the V profile of the rail.

8. The crane of claim 1, wherein the rollers of the roller chain have arcuate faces, the post bearing surface has an arcuate face, and the faces of the rollers of the roller chain matingly interface with the arcuate face of the post bearing surface.

9. The crane of claim 1, further comprising a back roller including a rotational axis generally parallel to the vertical axis and a roller surface in rolling contact with the post bearing surface, wherein the back roller is operably coupled to the superstructure and positioned along the post bearing surface in a location not encompassed by the roller chain.

10. The crane of claim 1, further comprising a containment pad secured to the vertical post and/or the superstructure and adapted to prevent the displacement of the roller chain in at least one vertical direction.

11. The crane of claim 1, further comprising a flange supported by the superstructure and adapted to prevent the displacement of the roller chain in at least one vertical direction.

12. The crane of claim 1, wherein the roller chain encompasses at least approximately 270 degrees of arc along the post bearing surface of the vertical post.

13. The crane of claim 1, wherein the equal spacing of the rollers comprises a radial offset between consecutive rollers in the chain between approximately two degrees and approximately 20 degrees.

14. The crane of claim 1, wherein the equal spacing of the rollers comprises a radial offset between consecutive rollers in the chain between approximately five degrees and approximately 15 degrees.

* * * * *

UNITED STATES PATENT AND TRADEMARK OFFICE
CERTIFICATE OF CORRECTION

| | | |
|---|---|---|
| PATENT NO. | : 7,891,508 B2 | Page 1 of 1 |
| APPLICATION NO. | : 10/786202 | |
| DATED | : February 22, 2011 | |
| INVENTOR(S) | : Pierre C. Delago | |

It is certified that error appears in the above-identified patent and that said Letters Patent is hereby corrected as shown below:

SPECIFICATION

| Column | Line | PTO | Should Read |
|---|---|---|---|
| 4 | 36 | "stewing gear assembly 85" | -- slewing gear assembly 85 -- |

Signed and Sealed this

Thirty-first Day of May, 2011

David J. Kappos
*Director of the United States Patent and Trademark Office*